March 2, 1943.

J. P. VOLLER ET AL 2,312,944

DENSITY COMPENSATOR FOR FLOW METERS

Filed April 22, 1941

2 Sheets-Sheet 1

JAMES P. VOLLER
EDGAR R. LOUD
INVENTORS

BY
Harry Dexter Peck
ATTORNEY

JAMES P. VOLLER
EDGAR R. LOUD
INVENTORS

Patented Mar. 2, 1943

2,312,944

UNITED STATES PATENT OFFICE 2,312,944

DENSITY COMPENSATOR FOR FLOW METERS

James P. Voller, Providence, and Edgar R. Loud, Cranston, R. I., assignors to Builders Iron Foundry, Providence, R. I., a corporation of Rhode Island Application April 22, 1941, Serial No. 389,768

5 Claims. (Cl. 73—206)

This invention relates to improvements in density compensator for flow meter. More especially it has to do with means actuated by changes in the density of the liquid being metered to effect an accurate register of the quantity of liquid flowing.

Variations of density occur in many liquids, for example, oils and other petroleum products which are now pumped through many miles of pipe lines. The density of the same liquid in the same pipe line may change from one place to another because of the changes in the temperature of the liquid at different points in its travel. It is essential for accurate registering of the quantity of liquid flowing that the flow meter be adjusted in accordance with any change of density which occurs.

The principal object of the present invention is to provide a compensator which alertly responds to changes in the density of the liquid moving in the flow line and immediately adjusts the integrator of the meter in accordance with such changes. In the particular form of the invention herein disclosed the novel compensator acts to change the effective length of a pendulum and thereby control the speed of a clock movement associated with the integrating means. The compensator also positions a chart pen for making a record of the density of the liquid. The principles of our invention are herein disclosed as applied to a flow meter in which the integrating mechanism is driven by a spring wound pendulum clock movement.

The best mode in which we have contemplated applying the principles of our invention is shown in the accompanying drawings but these are to be taken as merely illustrative because it is intended that the patent shall cover by suitable expression in the appended claims whatever features of patentable novelty exit in the invention disclosed.

Figure 1:
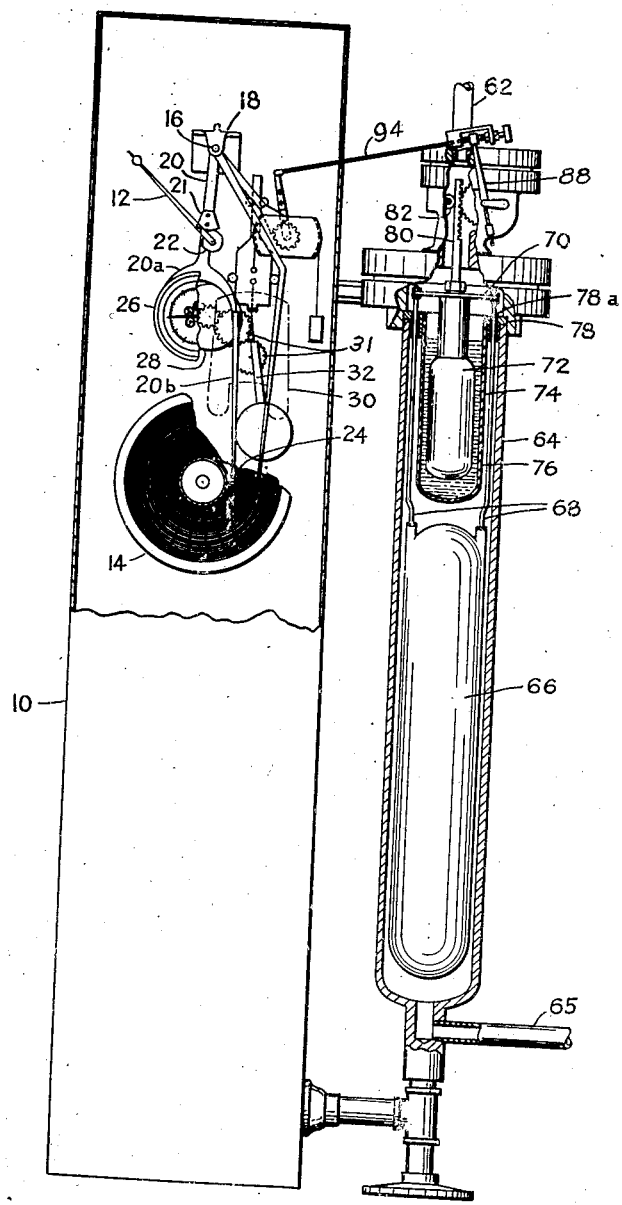
Figure 2:
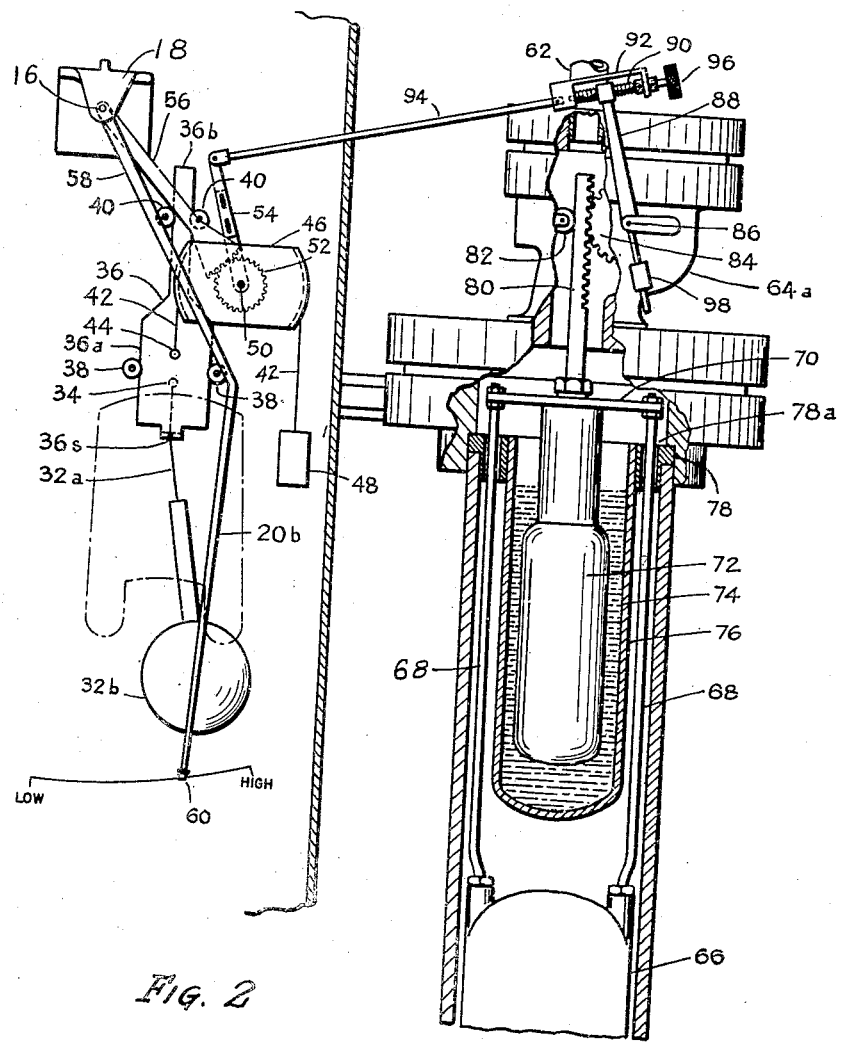

In the accompanying drawings:

Figure 1 is an elevation, partly in section, of our novel density compensator applied to the integrator of a flow meter; and Figure 2 is a partial elevation, also partly in section, showing the essential details in enlarged scale.

Referring more particularly to the drawings, and especially to Figure 1, a flow meter 10, shown for purpose of illustration is of the manometric type actuated by a difference in pressures obtained from a Venturi tube or other differential producer in the flow line. Such a meter may have a dial (not shown in the drawings) over which a pointer 12 sweeps to indicate the momentary rate of flow, and a chart 14 which turns at a constant speed to make a complete rotation in a day, a week, or in any desired period of time. From a shaft 16 supported by a suitable bracket 18 is suspended an arm 20 provided with a yoke-like portion 20a about midway of its length. The arm 20 carries a rack 21 which meshes with a pinion 22 secured to a shaft on which the pointer 12 is mounted. From one end of the yoke-like portion 20a the lever has a downwardly depending arm 20b with a chart pen 24 at its tip arranged to make a permanent record on the chart 14. The arm 20 is positioned by well known means actuated by changes in pressures, or a change in a differential pressure, produced by a Venturi tube, orifice plate or the like interposed in the flow line.

Mounted on the yoke-like portion 20a is integrating mechanism 26, the dial and counters of which are partially shown in Figure 1. The mechanism is geared to a friction roller (not shown) which rides on the face of a revolving disk 28. The latter is driven by a clock movement represented by the dot-and-dash outline 30, the driving connection being indicated by the series of gears 31. As the arm 20 is moved due to changes in the rate of flow, the integrator and its associated roller are swung across the face of the disk 28, the roller approaching the axis of the disk as the rate of flow diminishes and moving toward the periphery of the disk when the rate of flow increases. Thus the total quantity of flow registered by the integrator during a given period of time depends upon the position of the roller on the face of the revolving disk 28 and the speed of rotation of this disk. When metering the flow of a liquid whose density remains constant, the speed of rotation of the disk is maintained constant also, but if the density of the liquid varies, then such variation must be taken account of if the quantity of flow is to be accurately registered by the integrator. In short, some compensating means must be employed and it is to such means that the present invention is primarily directed.

The essence of the invention resides in the provision of simple means whereby the speed of rotation of the disk 28 is altered in accordance with variations in the density of the liquid being metered. More specifically, the particular compensator herein disclosed changes the effective length of a pendulum 32 associated with the clock movement 30 and thereby changes the speed of the clock movement and hence the angular velocity of the disk 28.

Referring now to Figure 2, the upper end of the pendulum strap 32a carrying the weight 32b is rigidly attached to a fixed support represented by the dotted circle 34. The strap extends downward through a slot 36S in the lower edge of a fulcrum plate 36. The distance between this slot, which determines the actual fulcrum of the pendulum, and the center of gravity of the pendulum is the effective length of the pendulum.

The fulcrum plate 36 is mounted between a pair of suitable rollers 38 beside its lower and somewhat broader portion 36a and its upwardly extending and narrow portion 36b is guided by another pair of rollers 40. These sets of rollers maintain the plate in proper alignment while permitting free vertical motion. If the plate is raised the effective length of the pendulum is increased and the speed of the clock mechanism is correspondingly reduced. If the plate is lowered the effective length of the pendulum is reduced and the speed of the clock mechanism correspondingly increased. As the speed of the clock mechanism is thus changed, the rotative speed of the disk 28 is altered.

A cable 42, or the like, secured at one end to a pin 44 outstanding from the plate 36, passes partly around a fulcrum suspension pulley 46, and carries at its other end a weight 48 which counterbalances the weight of the plate 36. This pulley 46 is attached to a shaft 50 on which is also secured a gear 52 and an adjustable length lever arm 54. The teeth of the pinion mesh with teeth on the segment end of a lever 56 journaled on the shaft 16 supported in the bracket element 18. Mounted on this same journal is another lever arm 58 which carries at its lower end a recording pen 60 whose point rides on the chart 14. This pen makes a permanent record of the momentary density of the liquid. As the fulcrum suspension pulley 46 is swung it effects simultaneous movement of the fulcrum plate 36 and the pen 60.

The movement of the pulley 46 is in accordance with changes in the density of the flowing liquid being metered. A continuous sample of this liquid is caused to leave the flow line (not shown) and is conducted, as by a pipe 62, to the top of a casing 64 through which the sample passes downwardly and thence through another pipe 65 back to the flow line. The casing 64 is for the most part tubular in configuration to provide a chamber in the lower portion of which is a sealed hydrometer float 66. This is attached by rods 68 to a plate 70 which at its center is secured to another sealed float 72. This latter float is partly submerged in the liquid and partly submerged in a body of manometric fluid, such as the mercury 74, which rests in a well 76. The upper edge of this well is secured to a sleeve member 78, through suitable holes 78a of which the rods 68 loosely extend and through which holes the sample of liquid passes downward in its course through the casing.

A rack 80 is mounted on the top of plate 70 and extends upward between a backing-up roller 82 and a pinion 84 secured to a shaft 86 which projects outside the upper section 64a of the casing and carries a lever 88. The upper end of this lever is threaded to receive a threaded shaft 90 suitably mounted for rotation in a bracket 92 attached to one end of a rod 94, the other end of which rod is pivotally connected to the lever arm 54. A knurled handle 96 on the end of shaft 90 permits rotation of the latter to adjust the relation between the rod 94 and the lever 88. An adjustable weight 98 on the lower arm of the lever 88 permits counterbalancing of the parts tending under the influence of gravity to cause rotation about the axis of shaft 86.

The operation of the compensator is as follows. So long as the density of the liquid being metered remains constant the floats 66 and 72 will continue in balance, so to speak. That is, the combined buoyant effects of the liquid on float 66 and float 72 and the mercury on float 72, counteracts the weight of the floating parts. Assume now that the density of the liquid being metered increases. As the sample passes through the casing 64 its buoyant effect on the two floats is increased and both will rise. However, this upward movement of the float 72 leaves less of it submerged in the mercury and thus the buoyant effect exerted by the mercury is reduced. Consequently the floats come to rest when the increased buoyant effect of the sample fluid and the reduced buoyant effect of the mercury again counterbalance the weight of the parts, and thus the new position of the floats corresponds to the increased density.

The upward movement of the floats causes the rack 80 to effect rotation of the pinion 84, the shaft 86 and the lever 88 in a clockwise direction, thereby pulling the rod 94 to the right and effecting clockwise rotation of the lever arm 54, the pulley 46 and the pinion 52. The rotation of this pinion causes the segment lever 56 to rotate counter-clockwise and effect like movement of the lever arm 58 and thus shift the position of the flow pen 60 toward the "high" end of its arc of movement and thereby record the increased density of the liquid.

As the pulley 46 rotates clockwise the fulcrum plate 36 and the slot 36S are raised and the effective length of the pendulum is increased, thus causing the speed of the clock movement 30 to be reduced. The ratio of the reduced speed to the previous speed is inversely proportional to the square root of the ratio of the previous density to the increased density. This is explained by noting that the period of a pendulum is directly proportional to the square root of the distance from its axis of rotation (the lower edge of the slot 36S) to the center of gravity of the pendulum. Consequently the speed of rotation, or angular velocity of the disk 28 is reduced as the square root of the effective length of the pendulum is increased. The effective length of the pendulum is increased directly in proportion to the increase in density of the liquid being metered. But the volume of liquid flowing varies inversely as the square root of the density of the liquid, and thus it follows that the change in the speed of the disk 28 is directly proportional to the change in the volume rate-of-flow as the density of the liquid changes.

If the density of the liquid is reduced, its buoyant effect on the floats is also lessened and they will accordingly sink to a lower level in reaching a condition of balance. This downward movement of the floats will reverse the detailed action above described and effect a decrease in the effective length of the pendulum and a consequent increase in the speed of the clock movement and disk 28 such that the change in speed will be inversely proportional to the square root of the change in the density of the liquid.

We claim:

1. A density compensator for a flow meter comprising, in combination, float means responsive to changes in the density of the liquid being metered; an integrator; means for driving the integrator comprising a pendulum having a weight supported by a strap from a fixed pivot for regulating the speed of the driving means; and control means comprising an element movable with respect to said strap thereby to provide an adjustable fulcrum therefor between said weight and said pivot, and linkage connecting said element and said float means whereby said element is positioned by said float means to vary the effective length of the pendulum in accordance with changes in the density of the liquid.

2. A density compensator for a flow meter comprising, in combination, float means responsive to changes in the density of the liquid being metered; an integrator; means for driving the integrator comprising a rotating disk; a clock movement for rotating said disk having a pendulum whose effective length can be varied to thereby regulate the speed of the clock movement; and control means comprising an adjustable fulcrum for said pendulum and linkage connecting said float means and said fulcrum whereby the latter is adjusted by said float means to vary the effective length of the pendulum and thereby the speed of the clock movement and said disk in accordance with changes in the density of the liquid.

3. A density compensator for a flow meter comprising, in combination, float means responsive to changes in the density of the liquid being metered; an integrator; driving means for the integrator including a pendulum comprising a strap, whose effective length can be varied to vary the effective length of the pendulum; and mechanism actuated by the float means for changing the effective length of the pendulum comprising a fulcrum plate having a slot through which the strap of the pendulum extends, a pulley, a tie extending from said plate partly around said pulley and carrying a weight to counterbalance said plate, and means including linkage connecting said pulley with the float means whereby as the latter moves in response to changes in the density of the liquid the pulley is rotated and the plate moved to alter the effective length of the pendulum and thus vary the speed of the said driving means.

4. A density compensator for compensating an integrating flow meter in proportion to the square root of the density of the liquid being metered comprising, in combination, float means responsive directly to changes in the density of the liquid being metered; an integrator; means for driving the integrator comprising a pendulum whose effective length can be varied for regulating the speed of the driving means in inverse proportion to the square root of the effective length of said pendulum; a movable fulcrum plate associated with said pendulum for varying the effective length of the latter; and means actuated by said float means for moving said fulcrum plate in accordance with changes in the density of the liquid.

5. Means for compensating the integrator of an integrating flow meter in proportion to the square root of the density of the fluid being metered comprising, in combination, driving means for the integrator including a pendulum whose effective length can be varied to regulate the speed of said driving means in inverse proportion to the square root of the effective length of said pendulum, means for adjusting the effective length of said pendulum, float means responsive directly to changes in said density, and means connecting said float means and said adjusting means whereby the latter is moved by said float means in accordance with changes in said density.

JAMES P. VOLLER.
EDGAR R. LOUD.